(12) United States Patent
Laux

(10) Patent No.: US 9,091,441 B2
(45) Date of Patent: Jul. 28, 2015

(54) OXYGEN TO EXPAND BURNER COMBUSTION CAPABILITY

(71) Applicant: Stefan E. F. Laux, Williamsville, NY (US)

(72) Inventor: Stefan E. F. Laux, Williamsville, NY (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 40 days.

(21) Appl. No.: 13/894,167

(22) Filed: May 14, 2013

(65) Prior Publication Data

US 2013/0244189 A1 Sep. 19, 2013

Related U.S. Application Data

(60) Division of application No. 13/017,483, filed on Jan. 31, 2011, now Pat. No. 8,459,986, which is a continuation of application No. 11/475,026, filed on Jun. 27, 2006, now abandoned.

(51) Int. Cl.
  *F23L 17/00* (2006.01)
  *F23L 7/00* (2006.01)
  *F23D 1/00* (2006.01)

(52) U.S. Cl.
  CPC . *F23L 7/007* (2013.01); *F23D 1/00* (2013.01); *F23D 1/005* (2013.01); *Y02E 20/344* (2013.01)

(58) Field of Classification Search
  USPC .............. 431/10, 8, 19, 2; 110/342, 347
  See application file for complete search history.

(56) References Cited

U.S. PATENT DOCUMENTS

| | | | |
|---|---|---|---|
| 4,495,874 A | 1/1985 | Greskovich et al. |
| 4,614,159 A | 9/1986 | Sugiura et al. |
| 4,934,331 A | 6/1990 | Pommer |
| 4,955,349 A | 9/1990 | Feldinger |
| 5,242,296 A | 9/1993 | Tuson et al. |
| 5,580,237 A | 12/1996 | Leger |
| 5,803,724 A | 9/1998 | Oortwijn et al. |
| 5,975,886 A | 11/1999 | Philippe |
| 6,699,029 B2 | 3/2004 | Kobayashi et al. |
| 6,699,030 B2 | 3/2004 | Bool, III et al. |
| 7,185,595 B2 | 3/2007 | D'Agostini et al. |
| 7,497,682 B2 | 3/2009 | Kaczenski et al. |
| 2005/0019715 A1 | 1/2005 | D'Agostini et al. |

FOREIGN PATENT DOCUMENTS

| EP | 1416221 | 5/2004 |
|---|---|---|
| EP | 1517085 | 3/2005 |
| WO | WO 2004/007351 | 1/2004 |

OTHER PUBLICATIONS

"Burners and Combustion Systems for Pulverized Coal", Steam 40, Chapter 13, pp. 13-1 through 13-14, The Babcock & Wilson Company, US, 1992.

(Continued)

*Primary Examiner* — Avinash Savani
(74) *Attorney, Agent, or Firm* — Donald T. Black

(57) ABSTRACT

A burner at which fuel cannot be combusted with air as the only source of oxygen for combustion in a stable flame at the burner when the feed rate of the fuel is too low, when the fuel is fed at too high an air-to-fuel mass ratio, when the fuel contains too high an amount of inert matter, or when the specific energy content of the fuel is too low, is modified by supplying oxidant containing more than 21 vol. % oxygen into the base of a flame at the burner, whereupon such fuels can be combusted at the burner.

4 Claims, 3 Drawing Sheets

(56) References Cited

OTHER PUBLICATIONS

"Bool, L., "NOx Reduction From A-44MW Wall-Fired Boiler Utilizing Oxygen Enhanced Combustion", Clearwater Conference, Mar. 10-13, 2003, US."

Chantel-Pelage, Fabienne, "Oxygen-Enrichment for NOx control in coal-fired utility boilers", 29.sup.th International Tech. Conf., Apr. 18-22, 2004, US.

Larue, A.D., "Update of B&W's Low NOx Burner Experience", ASME International Joint Power Generation Conference, Jul. 24-25, 2000, US.

OXYGEN TO EXPAND BURNER COMBUSTION CAPABILITY

FIELD OF THE INVENTION

The present invention relates to combustion of carbonaceous fuel in a combustion device such as a coal-fired utility boiler.

BACKGROUND OF THE INVENTION

Combustion systems are usually designed, to burn fuel that is characterized in that one or snore properties of the fuel relevant to combustion of the fuel lies within a range of values. The combustion system generally performs at its highest efficiency when the fuel characteristics fall within the ranges for which the system is designed. Attempts to combust fuel having one or more characteristics outside the range for that characteristic might encounter equipment limitations that prevent the system from reaching design capacity or might lead to negative side effects resulting in operational problems, higher emissions and increased maintenance. Features that may be affected by attempts to combust fuels having one or more characteristics outside of the ranges for which the system is designed include stability of the combustion process, flame heat release pattern, combustion efficiency, NOx emissions, and air and flue gas fan capacity.

One example of a characteristic for which a combustion system is often designed is the mass flow rate of fuel into the combustion chamber of the system. Most solid fuel tired combustion systems (for example, systems that combust coal in a boiler) use air-swept pulverizers to dry and pulverize the fuel, which is then carried into the combustion chamber and ignited. Since the transport medium for the pulverized fuel is air, the pulverizers and the fuel piping are designed to achieve at least a minimum air velocity to avoid settling of fuel particles in the flowing stream of transport air. This design condition then requires operating the pulverizer with at least a minimum air flow rate, even under conditions of low fuel mass flow rates. Maintaining this minimum air flow rate thus dilutes the air/fuel mixture, under conditions of low fuel mass flow rates, to a degree that stable combustion can not be attained and the burner flame gradually extinguishes. This is typically the case at loads below 30% of the full load capacity of the pulverizer. Practitioners have found it necessary to use auxiliary fuel (such as natural gas or oil) to maintain flame and combustion stability when the fuel is being fed at such low rates.

A combustion method that permits combustion to be maintained with a stable flame, even at fuel mass flow rates below those for which the system is designed, would thus be useful.

Other examples of characteristics for which a combustion system is often designed are the content of inert (i.e. not combustible) matter (whether solid, such as ash and minerals, or liquid, typically water), and the specific energy value of the fuel, i.e. the amount of energy obtainable upon combustion of the combustible matter present per unit mass of combustible matter. Fuels that contain more inert matter than the range of inert matter for which the combustion system is designed, and fuels that have a specific energy value below the range of specific energy values for which the system is designed, when fed into the combustion system, cause many of the problems such as inability to maintain combustion with a stable flame.

Fuels that may lead to such operational problems may nonetheless have an economical advantage over fuels that conform to the design specifications of the system. Thus, a combustion method that permits combustion to be maintained with a stable flame, even with fuel that contains too high a proportion of inert matter or too low a specific energy value for the system, would thus be useful.

BRIEF SUMMARY OF THE INVENTION

One aspect of the present invention is a method of modifying operation of a burner, comprising (A) providing a burner through which a stream of air mixed with particulate solid carbonaceous fuel and one or more streams of air other than the air mixed with said fuel, can be fed and combusted in a stable flame at said burner, but wherein maintaining said stable flame at said burner when air provided in said streams is the only source of oxygen for said combustion requires that the fuel satisfy one or more conditions in that one or more of (1) the mass flow rate of the fuel through said burner, (2) the fuel-to-air ratio of the stream of air mixed with fuel that is fed through the burner, (3) the content of combustible (i.e. non-inert) matter in the fuel, and (4) the specific energy value of the fuel, must be at least sufficient for said stable flame to be maintained at said burner, (B) inserting through said burner a lance the outlet end of which is positioned to eject gas into the base of a flame at said burner, (C) feeding through said burner a stream of air-mixed with particulate solid fuel which does not satisfy at least one of said conditions and therefore cannot be combusted in a stable flame at said burner in air as the only source of oxygen for combustion, and feeding through said burner said one or more streams of air other than the air mixed with said fuel, (D) feeding gaseous oxidant comprising more than 21 vol. % oxygen through the outlet end of said lance, and (E) combusting said fuel and air fed in step (C) with said oxidant fed in step (D) in a stable flame at said burner, wherein said oxidant is fed into the base of said flame at a mass flow rate that maintains said stable flame.

Another aspect of the present invention is a method of operating a burner, comprising (A) providing a burner through which a stream of air mixed with particulate solid carbonaceous fuel, and one or more streams of air other than the air mixed with said fuel, can be fed and combusted in a stable flame at said burner, but wherein maintaining said stable flame at said burner when air provided in said streams is the only-source of oxygen for said combustion requires that the fuel satisfy one or more conditions in that one or more of (1) the mass flow rate of the fuel through said burner, (2) the fuel-to-air ratio of the stream of air mixed with fuel that is fed through the burner, (3) the content of combustible matter in the fuel, and (4) the specific energy value of the fuel, must be at least sufficient-far said stable flame to be maintained at said burner, (B) feeding through said burner a stream of air mixed with particulate solid fuel which does not satisfy at least one of said conditions and therefore cannot be combusted in a stable flame at said burner in air as the only source of oxygen for combustion, and feeding through said burner said one or more streams of air other than the air mixed with said fuel, and (C) combusting said fuel and air fed in step (B) in a stable flame at said burner while also feeding a stream of gaseous oxidant comprising more than 21 vol. % oxygen into the base of said flame at said burner, wherein said oxidant combusts with said fuel and air, wherein said oxidant is fed into the base of said flame at a mass flow rate that maintains said stable flame.

In both of the aforementioned aspects of the present invention, the stream of gaseous oxidant comprising more than 21 vol. % oxygen is in addition to the fuel-air stream and the one or more streams of air other than the air mixed with the fuel in the fuel-air stream.

In both of the aforementioned aspects of the present invention, the combustion that is made possible by feeding the gaseous oxidant is advantageously carried out without feeding supplemental fuel in gaseous, liquid or solid form such as natural gas or methane, fuel oil or liquid hydrocarbons, or solids which contain a higher content of volatilizable matter than is contained in the particulate solid fuel that is fed and combusted in the practice of this invention.

As used herein, that a flame is "stable" means that, once it is established under a given set of combustion conditions, it continues to burn indefinitely under those combustion conditions.

DETAILED DESCRIPTION OF THE INVENTION

Figure 1:
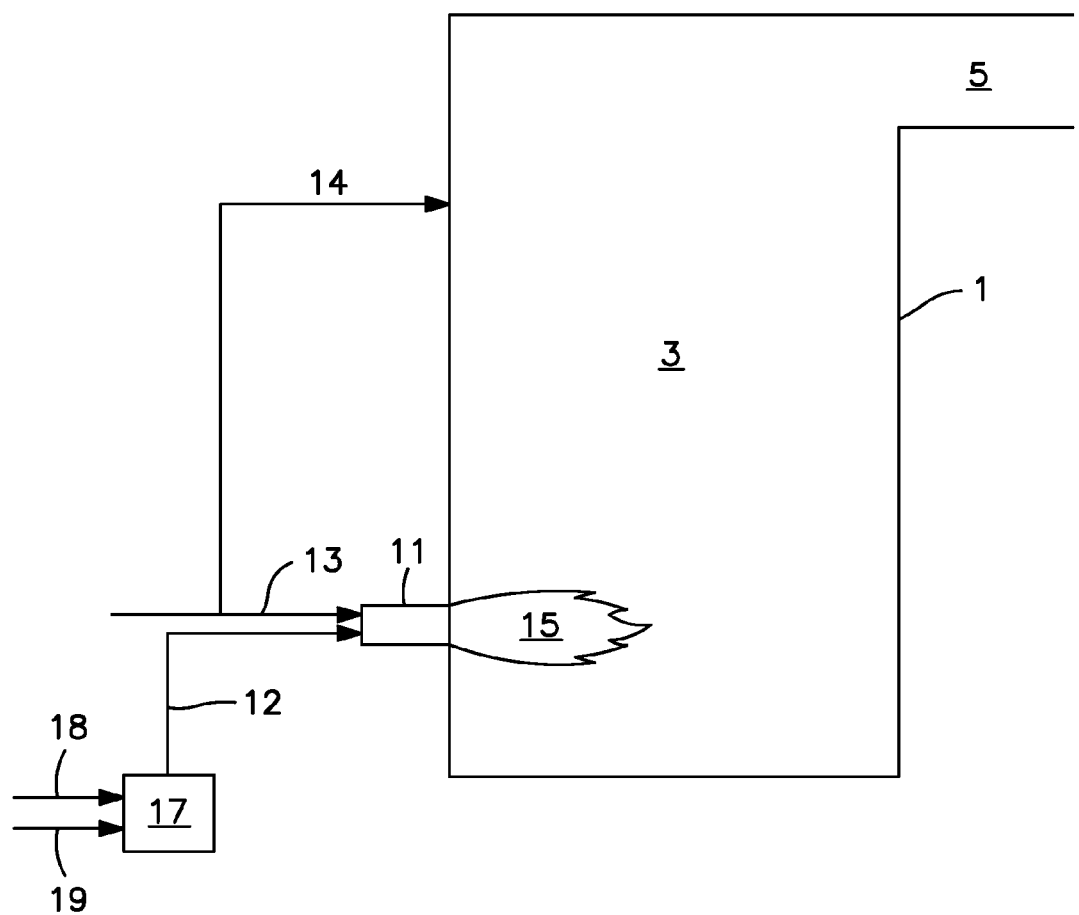
FIG. 1 is a cross-sectional view of one embodiment of apparatus with which the present invention can be practiced.

FIG. 1 depicts a representative combustion system with which the present invention can be practiced. The system includes combustion device 1, such as a coal-fired boiler. The fuel in this illustration is coal, but fuels with which the present invention is useful include any matter that has heating value, i.e. that liberates heat upon combustion. The terms "fuel" and "fuel solids" used herein refer to the matter that is fed to be combusted, including the combustible constituents thereof as well as any noncombustible constituents that are present.

Combustion, device 1 houses combustion chamber 3, which is typically a space that can withstand the high temperatures that, are attained by the combustion that is carried out in combustion chamber 3. The combustion chamber can be made of, or be lined with, refractory material, or it can be contained by walls of tubes that carry material such as water that absorbs heat from the combustion chamber. Products of the combustion pass out of combustion chamber through flue 5. The heat that is generated by the combustion can be used in any of various ways (not shown in FIG. 1) such as forming steam in pipes that surround combustion chamber 3 or that are arrayed across flue 5.

Burner 11 is provided through a surface of combustion device 1. In actual practice, anywhere from 1 to 20 or more barriers may be provided, depending on the size of the installation. Furthermore, the burners can be wall-mounted, roof-mounted, or corner-mounted. Fuel-air stream 12 comprising a mixture of fuel and air, and air stream 13, are fed through burner 11 and combusted in combustion chamber 3. The combustion forms flame 15 whose base is at the burner. Optional overfire air stream 14 of air is fed into combustion chamber 3 downstream from flame 15, between flame 15 and flue 5. When more than one burner is employed, the air streams 13 (and overfire air streams 14, when used) can be fed from a common windbox or plenum (not shown) which is conventional in current industrial practice.

The fuel-air stream 12 can be formed in unit 17, which in many embodiments is a pulverizer in which the fuel 18 is pulverized into particulate form that can be carried in a stream of transport air, and in which the fuel is mixed with air 19 which serves as transport air and which also provides some oxygen for combustion. The pulverizer typically has a maximum mass flow rate of fuel (termed the "full load") at which it can produce fuel-air stream 12. Unit 17 can instead be apparatus which forms the fuel-air stream by combining a stream of already pulverized particulate fuel with a stream of transport air.

Figure 2:
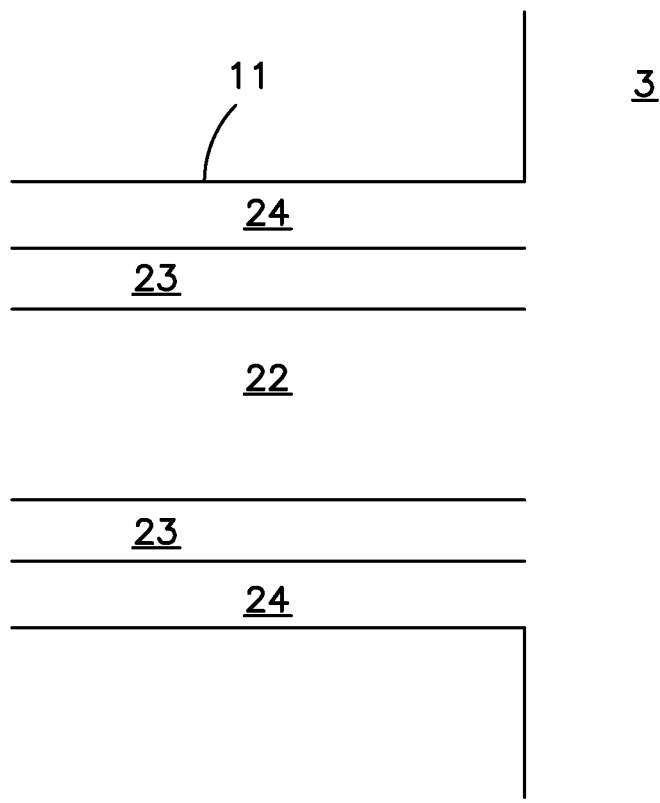
FIG. 2 is a cross-sectional view a burner useful in the embodiment of FIG. 1.
Figure 3:
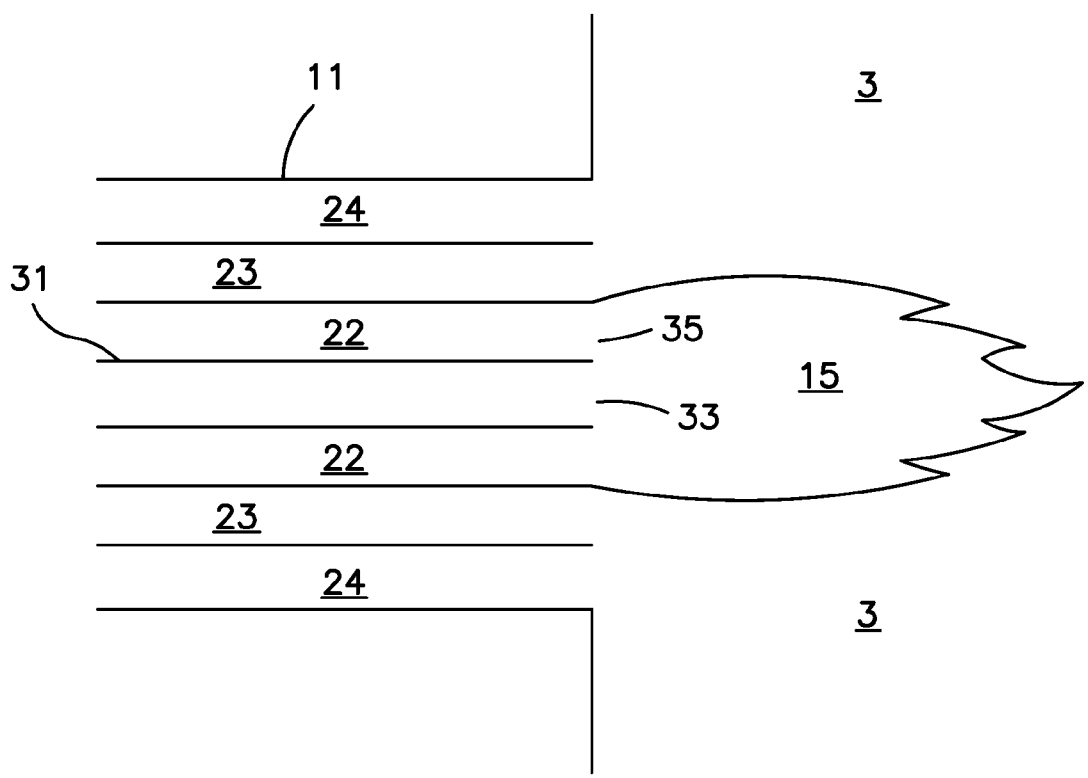
FIG. 3 is a cross-sectional view of the burner of FIG. 2, showing modification of that embodiment in accordance with the present invention.

FIGS. 2 and 3 depict in cross-section one embodiment of a burner 11, which is representative of burners with which the present invention can be practiced. Passage 22 conveys the fuel-air stream 12 toward and into combustion chamber 3, where it combusts in flame 15 as shown in FIGS. 1 and 3. Passage or passages 23 convey air stream 13 toward and into combustion chamber 3, where the air provides oxygen for combustion in flame 15. Optional passage or passages 24 convey secondary air toward and into combustion chamber 3, where the secondary air can participate in the combustion.

The burners depicted in FIGS. 2 and 3 are preferably circular, with passage 22 disposed along the central axis of the burner. In one embodiment there is one passage 23 which is annular and concentrically located completely around passage 22. In other embodiments, there can be two or more passages 23, each terminating in its own opening into combustion chamber 3. Likewise, the optional secondary air can be provided through one passage 24 that is concentrically located completely around passage 22, or through two or more separate passages each of which has its own opening into combustion chamber 3.

FIG. 3 depicts the burner of FIG. 2 which has been modified in accordance with the present, invention. Reference numerals that appear in both FIGS. 2 and 3 have the same meanings for the embodiment of FIG. 3 as for the embodiment of FIG. 2.

The embodiment of FIG. 3 includes lance 31 which is situated within passage 22. Lance 31 ends at opening 33 which is situated to feed gas out of opening 33 into the base 35 of flame 15. The other end of lance 31 is connected to a supply of oxidant which is equipped with suitable valves and controls so that it provides a stream of oxidant into lance 31 when desired and at the flow rate desired. The oxidant should contain more than 21 vol. % oxygen, and preferably contains more than 30 vol. % oxygen and more preferably at least 90 vol. % oxygen. The oxidant can be supplied from a suitable storage tank, or can be provided by combining a stream of air with a stream of commercially pure oxygen (e.g. 99 vol. % or higher purity oxygen) in amounts relative to each other that establish the desired oxygen content.

The present invention can be practiced in the following manner to modify a burner so that particulate solid carbonaceous fuel can be combusted at the burner even though the fuel is fed at a fuel solids mass flow rate so low that combustion of the fuel at the burner with air as the only source of oxygen for combustion cannot be maintained in a stable flame at the burner.

The minimum fuel solids mass flow rate is determined, for that burner, at which combustion of the fuel with air as the sole source of oxygen for combustion could be maintained in a stable flame at the burner. One way to determine this rate is to determine, at the minimum airflow rate that is necessary for operation of the burner, the minimum content of fuel solids in that airflow at which combustion of the fuel fed in that airflow can be maintained in a stable flame at the burner, with air as the only source of oxygen for combustion. The combination of the minimum airflow rate and the minimum fuel solids content establishes a minimum fuel solids mass flow rate at which combustion in air could be maintained at the burner in a stable flame.

Lance 31 or equivalent conduit is placed through burner 22 as shown in FIG. 3, with its outlet end positioned at the opening of the burner at its other end connected (through conventional valves and controls enabling control of the flow rate and enabling one to turn the flow on and off) to a source of oxidant containing more than 21 vol. % oxygen, conveniently at least 30 vol. % oxygen, and preferably at least 90 vol. % oxygen.

Then, a fuel-air stream is fed through the burner at a solids mass flow rate which is lower than that minimum established as described above, combustion air is fed through the burner (for instance, through passage or passages 23 of the burner in FIG. 3), and oxidant containing more than. 21 vol. % oxygen, conveniently at least 30 vol. % oxygen, and preferably at least 90 vol. % oxygen, is fed through lance 31. If combustion at the burner has already been established, the oxidant emerging at outlet 33 is fed, into the base 35 of the flame at the burner. If combustion at the burner has not already been established, the mixture, of the fuel-air stream, the combustion air stream, and the oxidant is ignited, and the oxidant emerging at outlet 33 is fed into the base 35 of the flame at the burner.

The mass flow rate at which oxygen is fed into the base of the flame is adjusted to determine a value at which combustion of the fuel is maintained in a stable flame at the burner. Then, the flow rate of oxygen is held at that level, or is increased to ensure stable combustion even in the event of fluctuations of the mass flow rate of the fuel. Typically, the amount of oxygen that is present in the oxidant emerging from outlet 33 into the base 35 of the flame is 1% to 25% of the total stoichiometric amount required to completely combust the combustible portion of the fuel that is fed. If desired, the oxygen content of the oxidant can be adjusted to accommodate the needs of the situation; as the feed rate decreases, increasing the oxygen content of the oxidant will generally be needed to maintain stable combustion of the fuel.

This embodiment of the invention is expected to permit combustion in a stable flame at the burner to be maintained even when the fuel solids mass flow rate corresponds to 30% or less of the minimum fuel solids mass flow rate needed for stable combustion to be maintained when air is used as the only source of oxygen for combustion. The minimum fuel solids mass flow rate at which this invention becomes applicable, whether expressed as an absolute figure or as a percentage of the maximum flow rate, varies from one unit to another but can readily be determined experimentally for any unit.

The present invention can be practiced in the following manner to modify a burner so that particulate solid carbonaceous fuel can be combusted in the burner even though the stream of air mixed with fuel which is fed through the burner (such as from a pulverizer) has an air-to-fuel mass ratio so high, such as 2.5 or higher or even 3.0 or higher (i.e. that might be encountered upon "turndown" of the combustion rate), that combustion of the fuel in the burner with air as the only source of oxygen for combustion cannot be maintained in a stable flame at the burner. (It will of course be recognized that references herein to an air-to-fuel ratio too high to enable a stable flame, and to a fuel-to-air ratio needing to be above a value to enable a stable flame, are simply different ways of expressing the same point.)

The maximum air-to-fuel mass ratio in the stream of air mixed with fuel that is fed through the burner is determined, for that burner, at which combustion of the fuel can be maintained in a stable flame at the burner, with air as the only source of oxygen for combustion.

Lance 31 or equivalent conduit is placed through burner 22 as shown in FIG. 3, with its outlet end positioned at the opening of the burner at its other end connected (through conventional valves and controls enabling control of the flow rate and enabling one to turn the flow on and off) to a source, of oxidant containing more than 21 vol. % oxygen, conveniently at least 30 vol. % oxygen, and preferably at least 90 vol. % oxygen. Then, a fuel-air stream is fed through the burner wherein the air-to-fuel ratio of that stream is higher than that maximum established as described above, combustion air is fed through the burner (for instance, through passage or passages 23 of the burner in FIG. 3), and oxidant containing more than 21 vol. % oxygen, conveniently at least 30 vol. % oxygen, and preferably at least 90 vol. % oxygen, is fed through lance 31. If combustion at the burner has already been established, the oxidant emerging at outlet 33 is fed into the base 35 of the flame at the burner. If combustion at the burner has not already been established, the mixture of the fuel-air stream, the combustion air stream, and the oxidant is ignited, and the oxidant emerging at outlet 33 is fed, into the base 35 of the flame at the burner.

The mass flow rate at which oxygen is fed into the base of the flame is adjusted to determine a value at which stable combustion of the fuel is maintained in a flame at the burner. Then, the flow rate of oxygen is held at that level, or increased to ensure stable combustion even in the event of fluctuations of the content of noncombustible matter in the fuel. Typically, the amount of oxygen that, is present in the oxidant emerging from outlet 33 into the base 35 of the flame is 1% to 25% of the total stoichiometric amount required to completely combust the combustible portion of the fuel fed. If desired, the oxygen content of the oxidant can be adjusted to accommodate the needs of the situation; as the air-to-fuel ratio of the fuel feed stream increases, increasing the oxygen content of the oxidant will generally be needed to maintain stable combustion of the fuel.

The maximum air-to-fuel ratio in the fuel feed stream, above which the present invention becomes applicable, varies from one unit to another but can readily be determined experimentally for any given unit. In general, combustion of fuel fed in streams of air mixed with the fuel wherein the air-to-fuel ratio is below about 2.0 is less likely to need the assistance provided by the present, invention, whereas the ability of the present invention to achieve combustion of fuel fed in feed streams having higher air-to-fuel, ratios is likely to be realized with fuel feed streams fed at air-to-fuel ratios of 2.5 or higher, and even more likely when fed at air-to-fuel ratios of 3.0 or higher.

The present invention can be practiced in the following manner to modify a burner so that particulate solid carbonaceous fuel can be combusted in the burner even though the fuel contains an amount of noncombustible (inert) material so high, up to 70 or 75 wt. %, or even 80 to 90 wt. %, that combustion of the fuel in the burner with air as the only source of oxygen for combustion cannot be maintained in a stable flame at the burner. Fuel containing that much inert material can be found or formed naturally, or can be formed by blending fuel with lesser (or no) inert material with inert material or with fuel containing even higher amounts of inert material.

The maximum content of noncombustible matter in the fuel is determined, for that burner, at which combustion of the fuel can be maintained in a stable flame at the burner, with air as the only source of oxygen for combustion.

Lance 31 or equivalent conduit is placed through burner 22 as shown in FIG. 3, with its outlet end positioned at the opening of the burner at its other end connected (through conventional valves and controls enabling control of the flow rate and enabling one to turn the flow on and off) to a source of oxidant containing more than 21 vol. % oxygen, conveniently at least 30 vol. % oxygen, and preferably at least 90 vol. % oxygen. Then, a fuel-air stream is fed through the burner wherein the content of noncombustible matter in the fuel is higher than that maximum established as described above, combustion air is fed through the burner (for instance, through passage or passages 23 of the burner in FIG. 3), and oxidant containing more than 21 vol. % oxygen, conveniently at least 30 vol. % oxygen, and preferably at least 90 vol. % oxygen, is fed through lance 31. If combustion at the burner has already been established, the oxidant emerging at outlet 33 is fed into the base 35 of the flame at the burner. If combustion at the burner has not already been established, the mixture of the fuel-air stream, the combustion air stream, and the oxidant is ignited, and the oxidant emerging at outlet 33 Is fed into the base 35 of the flame at the burner.

The mass flow rate at which oxygen is fed into the base of the flame is adjusted to determine a value at which stable combustion of the fuel is maintained in a flame at the burner. Then, the flow rate of oxygen is held at that level, or increased to ensure stable combustion even in the event of fluctuations of the content of noncombustible matter in the fuel. Typically, the amount of oxygen that is present in the oxidant emerging from outlet 33 into the base 35 of the flame is 1% to 25% of the total stoichiometric amount required to completely combust the combustible portion of the fuel fed. If desired, the oxygen content of the oxidant can be adjusted to accommodate the needs of the situation; as the percentage of combustible matter in the fuel decreases, increasing the oxygen content of the oxidant will generally be needed to maintain stable combustion of the fuel.

The maximum noncombustible matter content above which the present invention becomes applicable varies from one unit to another but can readily be determined experimentally for any given unit. In general, combustion of fuels having noncombustible matter content below about 30 wt. % is less likely to need the assistance provided by the present invention, whereas the ability of the present invention to achieve combustion of fuel having high noncombustible matter content is likely to be realized with fuel containing 35 wt. % or higher noncombustible matter, and even more likely with fuel containing 40 wt. % or higher noncombustible matter.

The present invention can be practiced in the following manner to modify a burner so that particulate solid carbonaceous fuel can be combusted in the burner even though the specific energy content of the fuel (e.g. BTU per pound of fuel) is so low that combustion of the fuel in the burner with air as the only source of oxygen for combustion cannot be maintained in a stable flame at the burner.

The minimum specific energy content of the fuel is determined at which combustion of the fuel can be maintained in a stable flame at the burner, with air as the only source of oxygen for combustion.

Lance 31 or equivalent conduit is placed through burner 22 as shown in FIG. 3. with its outlet end positioned at the opening of the burner at its other end connected (through conventional valves and controls enabling control of the flow rate and enabling one to turn the flow on and off) to a source of oxidant containing more than 21 vol. % oxygen, conveniently at least 30 vol. % oxygen, and preferably at least 90 vol. % oxygen.

Then, a fuel-air stream is fed through the burner wherein the specific energy content of the fuel is lower than that minimum established as described above, combustion air is fed through the burner (for instance, through passage or passages 23 of the burner in FIG. 3), and oxidant containing more than 21 vol. % oxygen, conveniently at least 30 vol. % oxygen, and preferably at least 90 vol. % oxygen, is fed through lance 31. If combustion at the burner has already been established, the oxidant emerging at outlet 33 is fed into the base 35 of the flame at the burner. If combustion at the burner has not already been established, the mixture of the fuel-air stream, the combustion air stream, and the oxidant is ignited, and the oxidant emerging at outlet 33 is fed into the base 35 of the flame at the burner.

The mass flow rate at which oxygen is fed into the base of the flame is adjusted to determine a value at which stable combustion of the fuel is maintained in a flame at the burner. Then, the flow rate of oxygen is held at that level, or increased to ensure stable combustion even in the event of fluctuations of the specific energy content of the fuel. Typically, the amount of oxygen that is present in the oxidant emerging from outlet 33 into, the base 35 of the flame is 1% to 25% of the total stoichiometric amount required to completely combust the combustible portion of the fuel fed. If desired, the oxygen content of the oxidant can be adjusted to accommodate the needs of the situation; as the specific energy content of the fuel decreases, increasing the oxygen content of the oxidant will generally be needed to maintain stable combustion of the fuel.

The minimum specific energy content below which the present invention becomes applicable varies from one unit to another but can readily be determined experimentally for any given unit. In general, combustion of fuels having specific energy content above about 10,000 BTU/pound. is less likely to need the assistance provided by the present invention, whereas the ability of the present invention to achieve combustion of fuel having low specific energy content is likely to be realized with fuel having a specific energy content of 8,000 BTU/pound or lower, as determined from a dried fuel sample, and even more likely with fuel having a specific energy content of 6,000 BTU/pound or lower as determined from a dried fuel sample.

What is claimed is:

1. A method of modifying operation of a burner, comprising
   (A) providing a burner having at least two concentric conduits, wherein a stream of air mixed with particulate solid carbonaceous fuel can be conveyed through an innermost conduit of said burner, and wherein one or more streams of air other than the air mixed with said fuel can be conveyed through a central conduit surrounding the innermost conduit, and wherein said fuel and air can be combusted in a stable flame at said burner,
   (B) determining the maximum air-to-fuel mass ratio of the stream of air mixed with fuel that is fed through said burner above which combustion of said fuel with air as the only source of oxygen for said combustion cannot be maintained in a stable flame at said burner,
   (C) inserting through said burner a lance the outlet end of which is positioned to eject gas into the base of a flame at said burner and the inlet end of which is connected to a source of gaseous oxidant comprising more than 21 vol. % oxygen,
   (D) feeding through said innermost conduit a stream of air mixed with said particulate solid fuel at an air-to-fuel ratio above said maximum, and feeding through said central conduit said one or more streams of air other than the air mixed with said fuel,
   (E) feeding gaseous oxidant comprising more than 21 vol. % oxygen through the outlet end of said lance, and
   (F) combusting said fuel and air fed in step (D) with said oxidant fed in step (E) in a stable flame at said burner, wherein said oxidant is fed into the base of said flame at a mass flow rate that maintains said stable flame.

2. A method according to claim 1 wherein the gaseous oxidant fed in step (D) comprises at least 90 vol. % oxygen.

3. A method of operating a burner, comprising
- (A) providing a burner having at least two concentric conduits, wherein a stream of air mixed with particulate solid carbonaceous fuel can be conveyed through an innermost conduit of said burner, and wherein one or more streams of air other than the air mixed with said fuel can be conveyed through a central conduit surrounding the innermost conduit, and wherein said fuel and air can be combusted in a stable flame at said burner,
- (B) feeding through said innermost conduit a stream of air mixed with said particulate solid fuel at an air-to-fuel ratio above the maximum air-to-fuel mass ratio of the stream of air mixed with fuel that is fed through said burner above which combustion of said fuel with air as the only source of oxygen for said combustion cannot be maintained in a stable flame at said burner, and feeding through said central conduit said one or more streams of air other than the air mixed with said fuel, and
- (C) combusting said fuel and air fed in step (B) in a stable flame at said burner while feeding gaseous oxidant comprising more than 21 vol. % oxygen into the base of said flame at said burner, wherein said oxidant combusts with said fuel and air, wherein said oxidant is fed into the base of said flame at a mass flow rate that maintains said stable flame.

4. A method according to claim 3 wherein the gaseous oxidant fed in step (C) comprises at least 90 vol. % oxygen.

* * * * *